United States Patent [19]

Leonhart

[11] Patent Number: 5,051,777
[45] Date of Patent: Sep. 24, 1991

[54] GRAPHIC ARTS APPARATUS

[75] Inventor: Charles J. Leonhart, Schaumburg, Ill.

[73] Assignee: nuArc Company, Inc., Niles, Ill.

[21] Appl. No.: 548,088

[22] Filed: Jul. 5, 1990

[51] Int. Cl.$^5$ ............................................. G03B 27/20
[52] U.S. Cl. ...................................... 355/93; 355/94
[58] Field of Search ............................ 355/91, 93, 94

[56] References Cited

U.S. PATENT DOCUMENTS

| | | |
|---|---|---|
| 3,738,748 | 6/1973 | Weihsmantel et al. ............... 355/93 |
| 4,240,743 | 12/1980 | Hliboki et al. ....................... 355/93 |
| 4,536,085 | 8/1985 | Hliboki et al. ....................... 355/93 |

FOREIGN PATENT DOCUMENTS 236651 7/1925 United Kingdom ................. 355/93

*Primary Examiner*—Monroe H. Hayes
*Attorney, Agent, or Firm*—Mason, Kolehmainen, Rathburn & Wyss

[57] ABSTRACT

A new and improved graphic arts device for exposing copy sheets to controlled light from a light source passed through an image sheet includes a light source and a glass frame including a rigid panel of transparent material having a surface against which an image sheet and a copy sheet are pressed during an exposure cycle. A vacuum blanket is provided for biasing the image and copy sheets against the planar surface of the transparent panel. A yoke is provided for supporting the glass frame between the vacuum blanket and the light source at a convenient working level for movement between a horizontal, closed position used during exposure and a second, upwardly sloping open position for permitting removal and placement of the image and copy sheets on the transparent panel. The glass frame is normally locked in position on the yoke but can be unlocked for a full 360° pivotal action about a central axis of the frame extending transversely between opposite legs of the yoke at said points thereon. This permits the transparent panel to be easily cleaned from the front of the device on both faces of the panel. The glass frame is formed of elongated frame member of extruded material, each frame member supporting an edge portion of the transparent panel. The panel is readily removed by detachment of one of the frame members by withdrawing a pair of fasteners used to attached the frame member to other frame members at right angles thereto. In addition, the graphic arts device is provided with a linkage mechanism for automatically lowering the vacuum blanket assembly away from the glass frame whenever the glass frame is pivoted upwardly toward the open position.

16 Claims, 8 Drawing Sheets

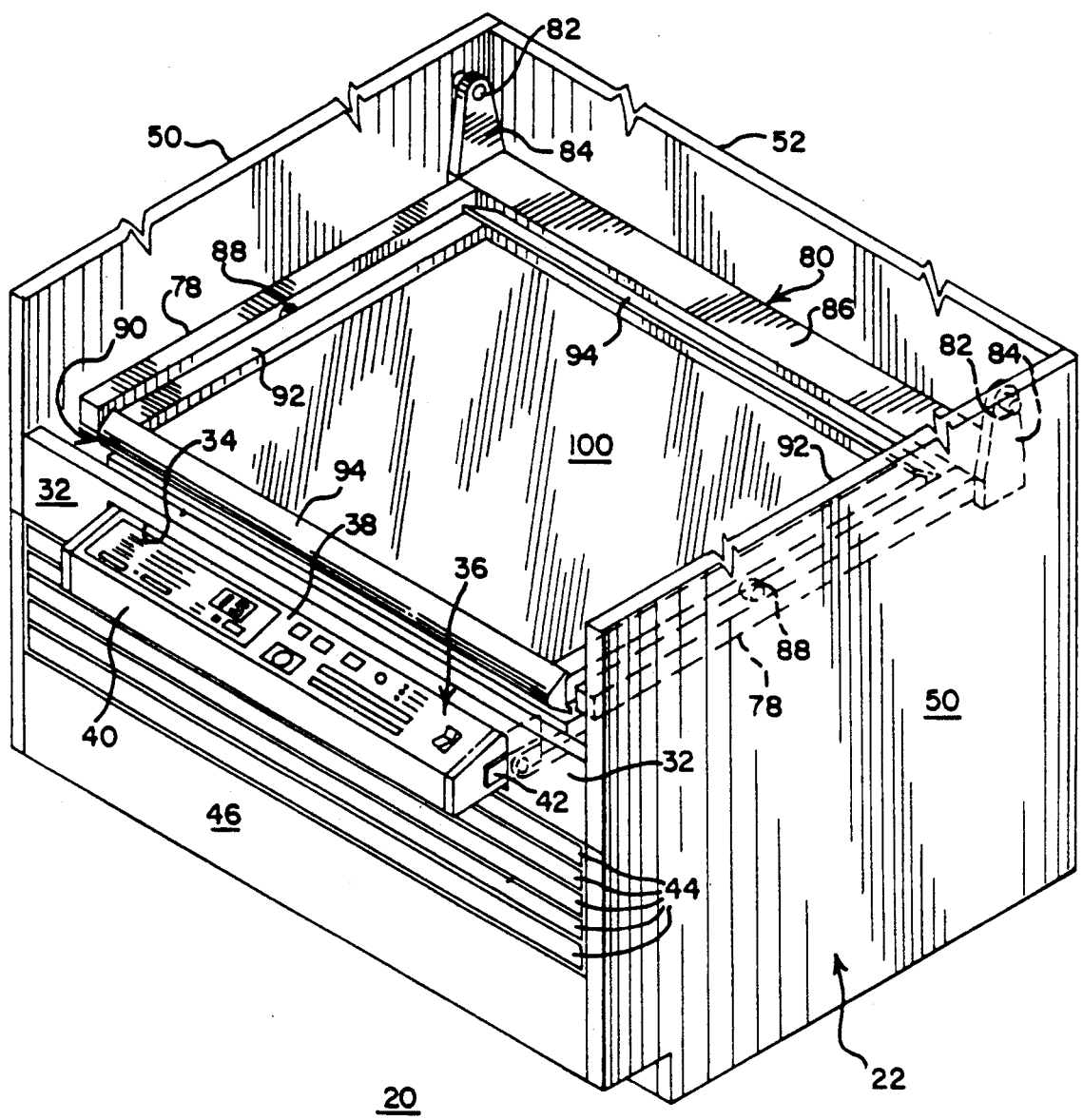

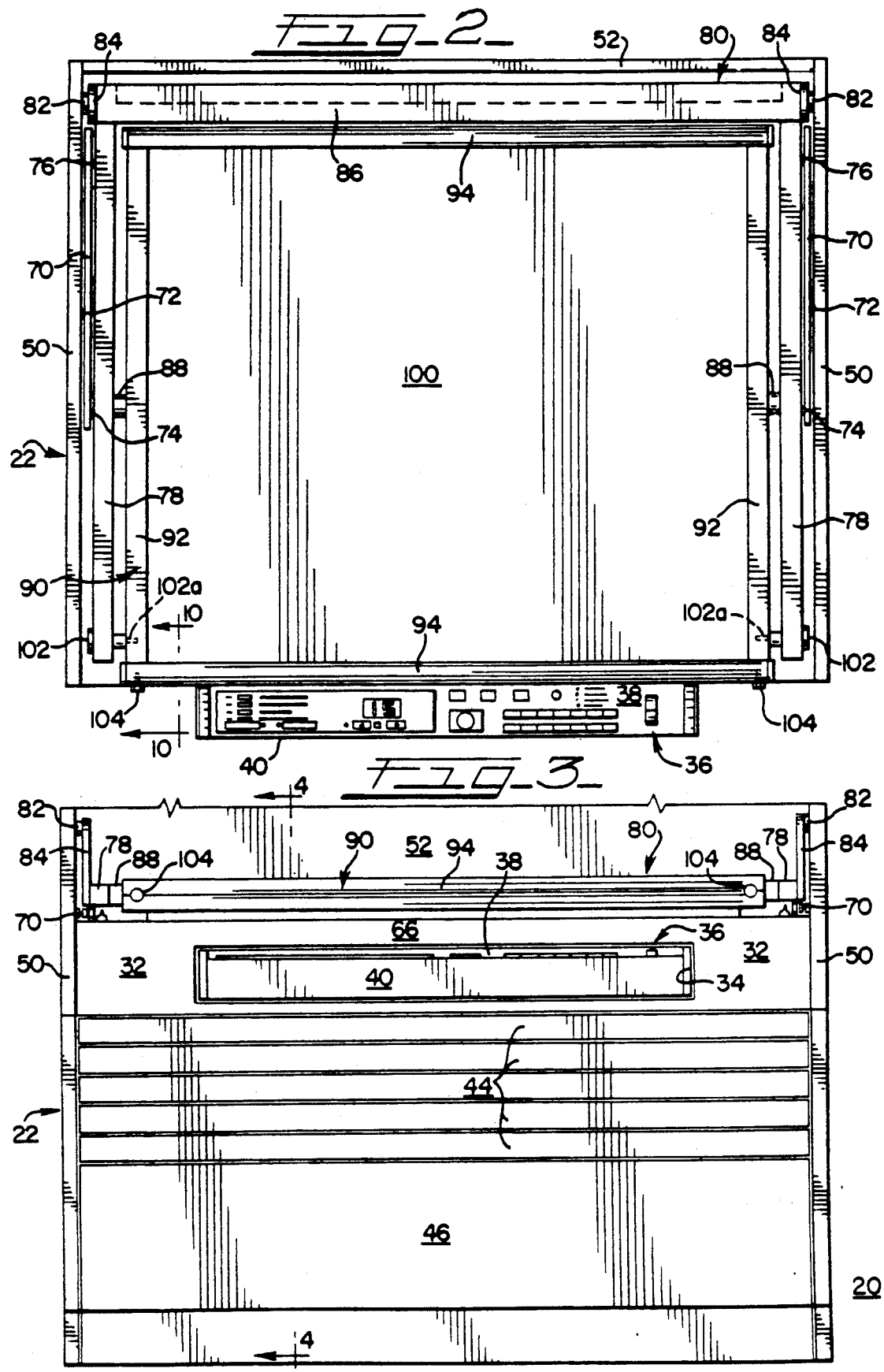

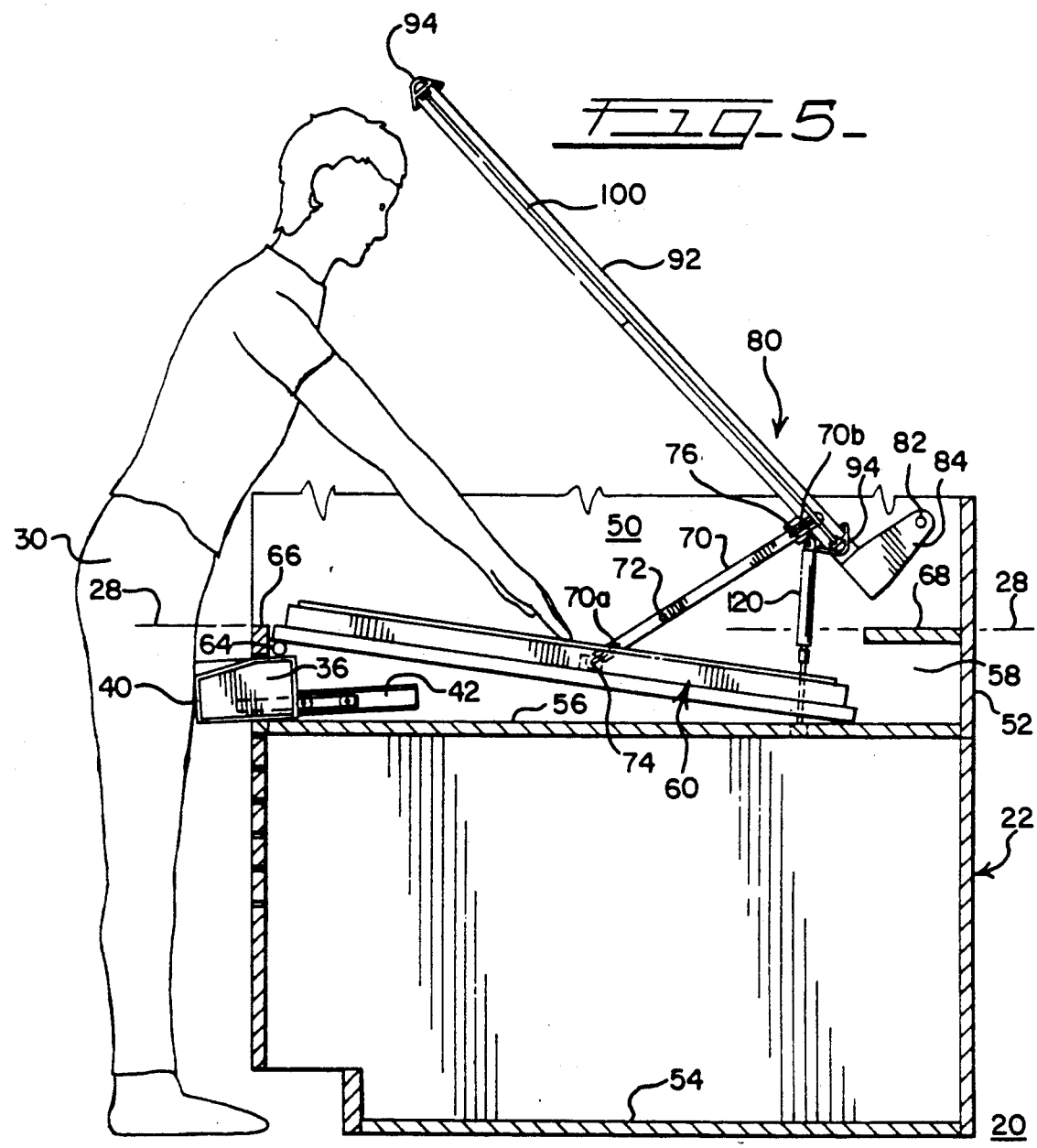

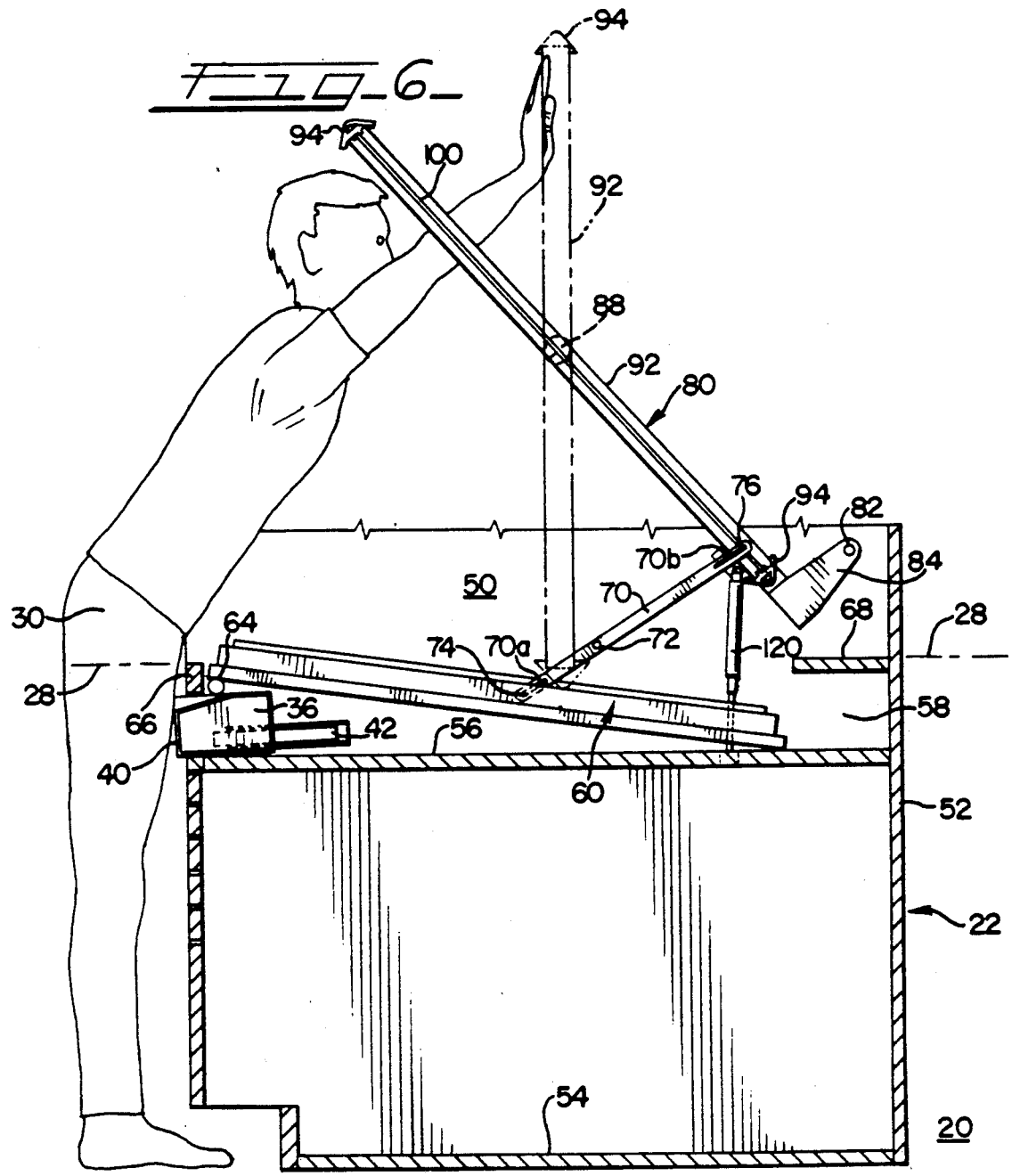

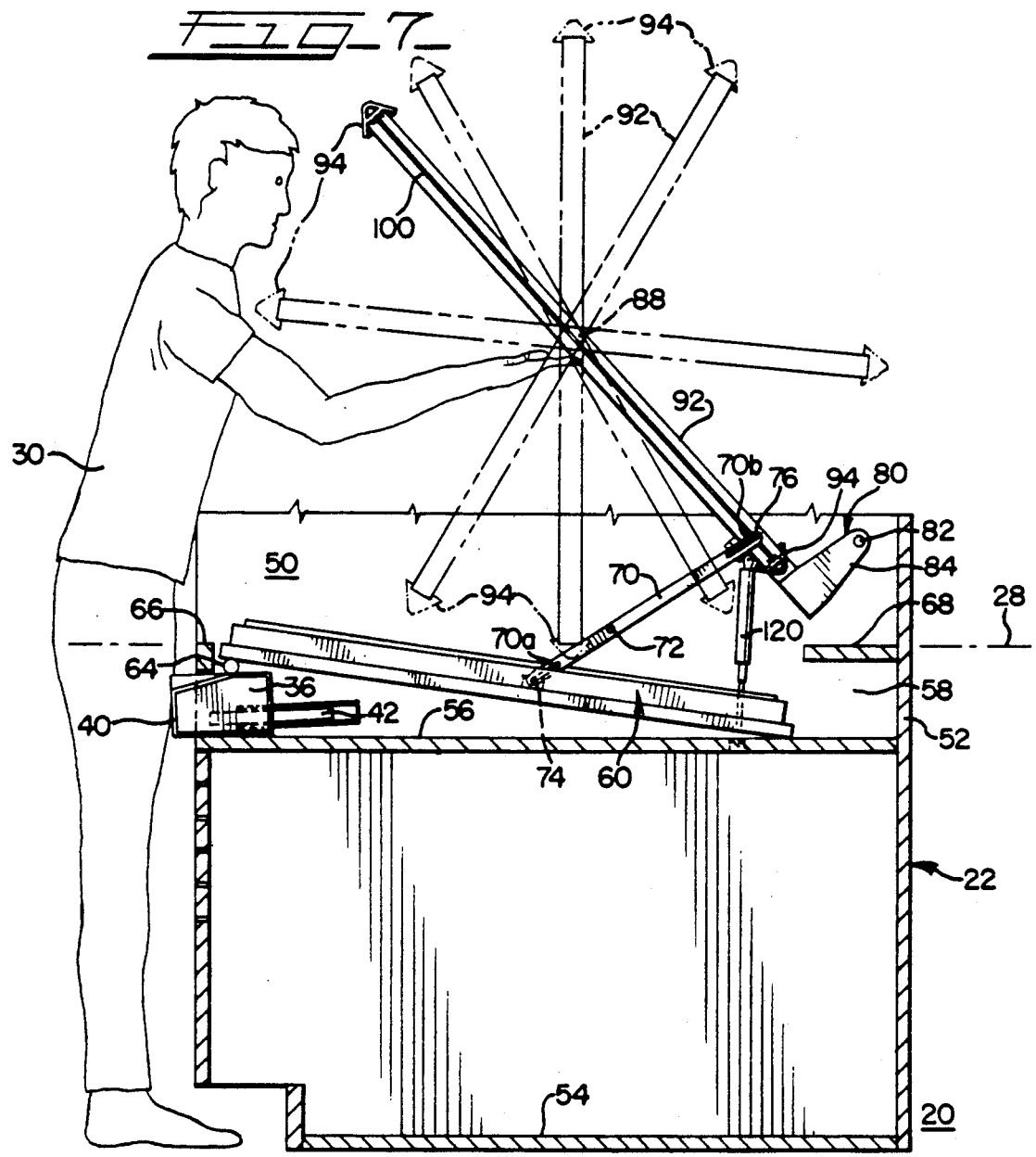

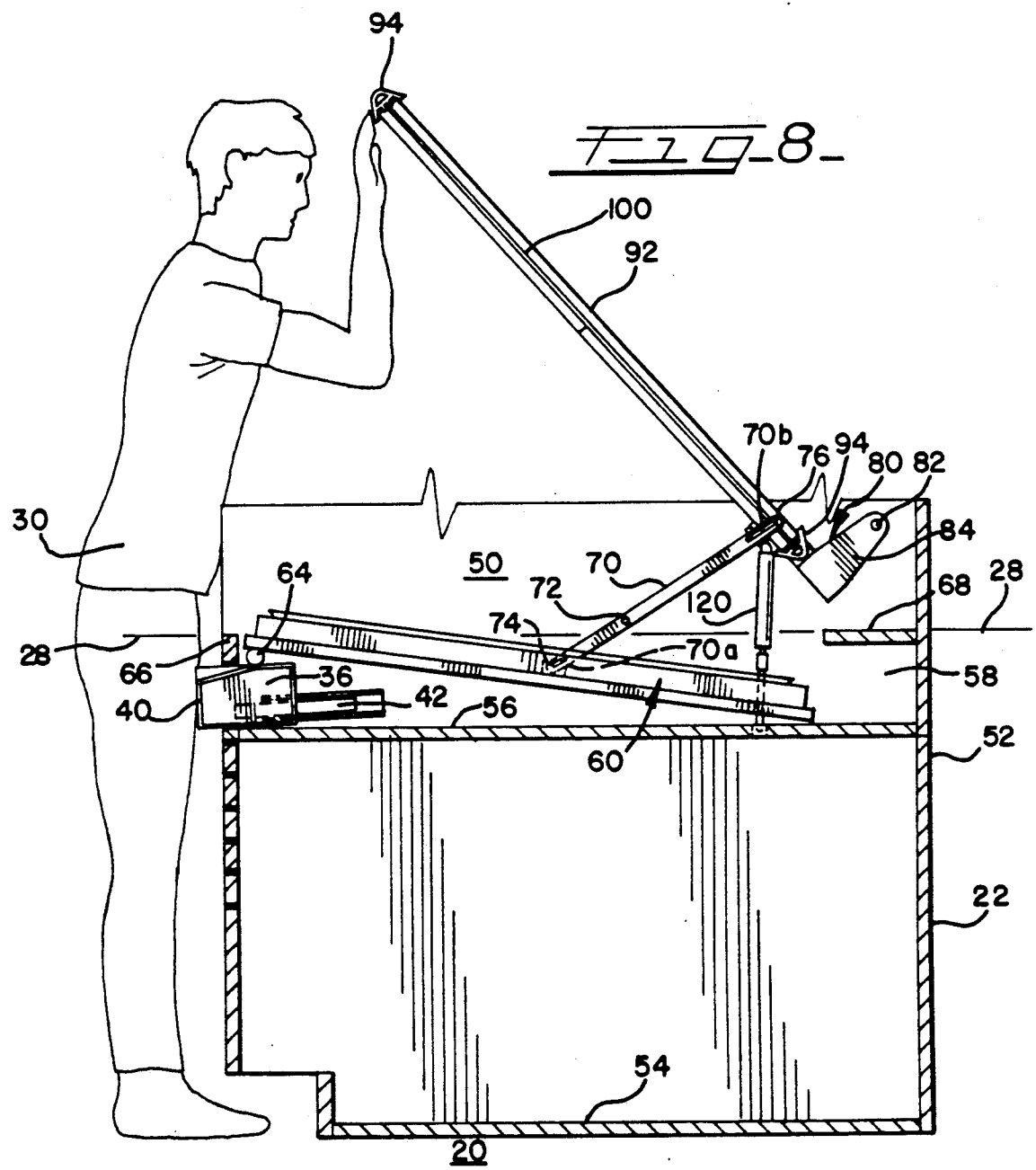

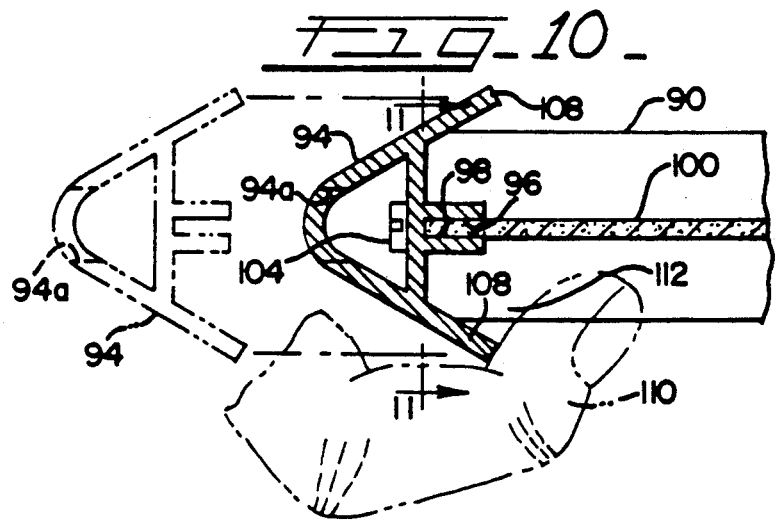
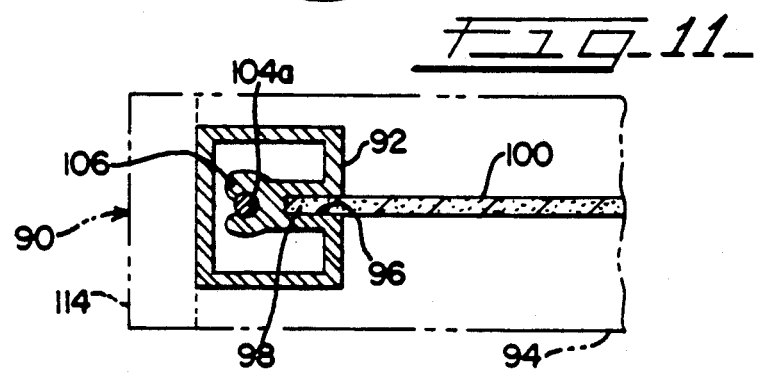
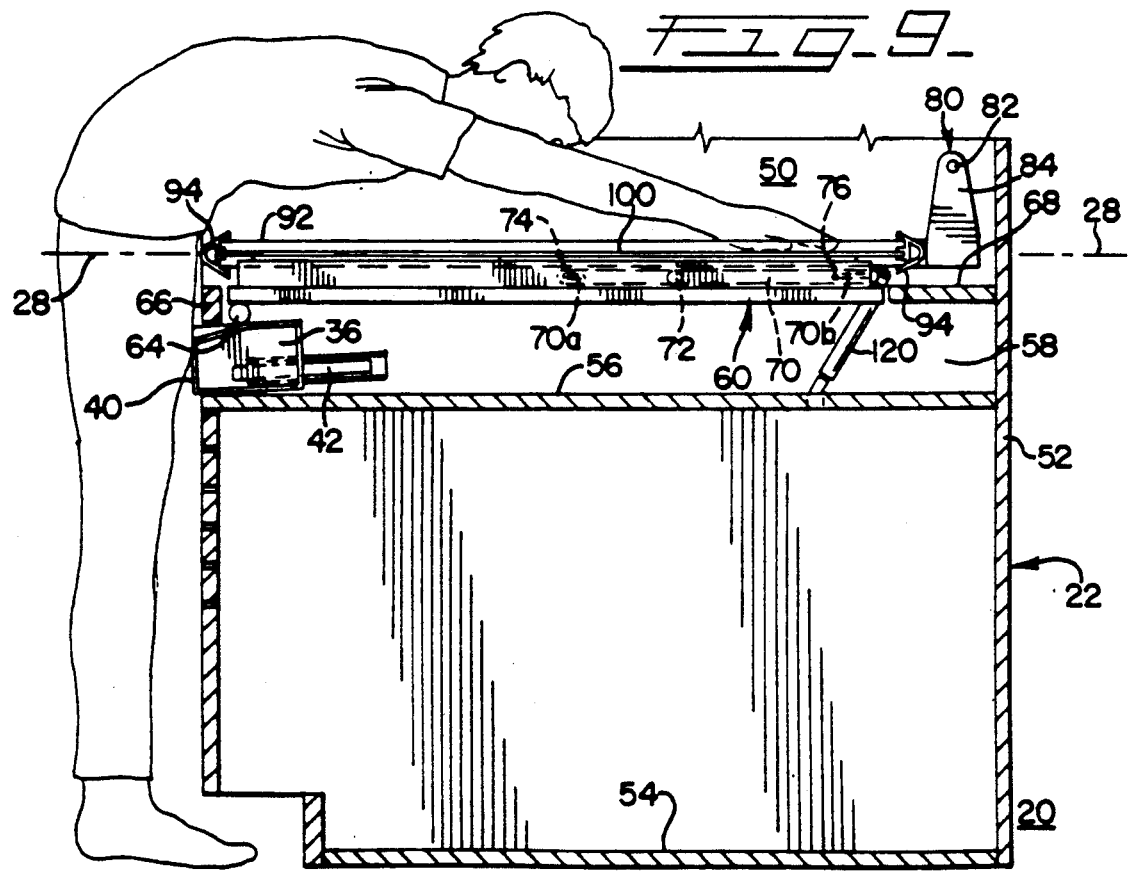

GRAPHIC ARTS APPARATUS

BACKGROUND OF THE INVENTION

1. Field of the Invention

The present invention relates to a new and improved graphic arts apparatus for exposing copy sheets to light flowing from a controlled light source through an image sheet pressed against a transparent panel of a glass frame. The graphic arts apparatus is especially designed for ease in operation so that high production rates can be achieved with high quality reproduction. A novel glass frame and glass frame supporting yoke is provided for facilitating, cleaning and/or replacement of transparent panels of glass or plastic when the need arises.

2. Description of the Prior Art

One of the problems associated with exposure devices is the problem caused by dust and other particles often present on image sheets, copy sheets and rigid transparent sheet materials used in such exposure devices. Such accumulations of dust and other particles cause "pinholes" to be present in a printed copy and for this reason, diffused light rather than collimated light is often desired to minimize the presence of such pinholes. It is also sometimes desirable to provide a sheet of light-modifying media spaced between the source of light and a positive or negative image sheet and a light sensitive copy sheet which are contained between a rigid, transparent sheet of glass or plastic material and a vacuum blanket for holding the sheets in precise registration.

OBJECTS OF THE INVENTION

It is an object of the present invention to provide a new and improved graphic arts apparatus for exposing copy sheets to light passed through an image sheet pressed against a rigid transparent panel contained in a glass frame and held in place by a vacuum blanket.

It is another object of the present invention to provide a new and improved graphic arts device of the character described which permits easy cleaning of opposite surfaces of the transparent panel in a glass frame.

Yet another object of the present invention is to provide a new and improved graphic arts device which has a novel glass frame permitting rapid and easy removal and replacement of a transparent panel when necessary.

Yet another object of the present invention is to provide a new and improved graphic arts device of the character described wherein a novel pivotally movable yoke assembly is provided for supporting a glass frame which in turn is pivotally supported from legs of the yoke for 360° rotational movement to provide fast and easy cleaning and maintenance.

Still another object of the present invention is to provide a new and improved graphic arts apparatus which includes novel linkage means for operatively interconnecting a glass frame and a vacuum blanket for movement toward and away from one another between a closed exposure position for biasing image and copy sheets against the transparent panel of the glass frame and an open position wherein the vacuum blanket is lowered gently away from the glass frame as the glass frame is pivoted upwardly to provide a wide open area for cleaning and inspection of both of the surfaces of the glass frame panel and vacuum blanket.

Another object of the present invention is to provide a new and improved graphic arts apparatus of the character described wherein a glass frame and vacuum blanket are pivotal in a range of relative angular movements always moving away from one another when the glass frame is opened and toward one another when the glass frame is closed.

Still another object of the present invention is to provide a new and improved graphic arts apparatus of the character described herein which is easy to clean, easy to operate and provides a means for easy removal and replacement of a transparent glass or plastic panel when necessary.

BRIEF SUMMARY OF THE PRESENT INVENTION

The foregoing and other objects and advantages of the present invention are accomplished in a new and improved graphic arts apparatus constructed in accordance with the features of the present invention and employing an overhead light source for directing controlled intensity light downwardly towards a rigid transparent panel supported on a pivotally mounted glass frame. The light passes through an image forming sheet and onto a light sensitive copy sheet held in place against the transparent panel by a vacuum blanket. The glass frame is supported for pivotal movement between a generally horizontal closed position wherein the vacuum blanket is operative to press the image forming sheet and the light sensitive copy sheet tightly together for controlled intensity exposure to light passing through the transparent panel on the glass frame and an upwardly tilted, open position providing support for the glass frame which can then be unlocked and pivoted about a central axis thereof in either direction for 360° to provide easier cleaning and inspection of opposite sides of the transparent panel. Linkage is provided for automatically interconnecting the glass frame and the vacuum blanket so that the vacuum blanket assembly moves downwardly away from the glass frame as the glass frame is pivoted upwardly into the open position. The glass frame is provided with a novel structural frame which permits easy and rapid removal and replacement of a transparent panel should damage or discoloration occur.

BRIEF DESCRIPTION OF THE DRAWING

These and other objects and advantages of the present invention will become readily apparent upon consideration of the following detailed description and attached drawing, wherein:

FIG. 1 is a front perspective elevational view of a lower portion of a new and improved graphic arts apparatus constructed in accordance with the features of the present invention;

FIG. 2 is a top plan view of the lower portion of the apparatus;

FIG. 3 is a front elevational view of the lower portion of the apparatus;

FIG. 5 is a cross-sectional view similar to FIG. 4 illustrating the operator in a normal operating position for placing image and copy sheet material on a vacuum blanket assembly of the apparatus;

FIG. 6 is a view similar to FIG. 4 illustrating the glass frame supporting yoke of the apparatus in an upwardly pivoted position;

FIG. 7 is a cross-sectional view similar to FIG. 4 illustrating a 360° pivotal movement of the glass frame of the apparatus when the supporting yoke is supported in the upwardly tilted open position;

FIG. 8 is a transverse cross-sectional view similar to FIG. 4 illustrating an operator ready to close the glass frame and yoke downwardly toward a horizontal operating position;

FIG. 9 is a transverse cross-sectional view similar to FIG. 4 illustrating the apparatus with the glass frame and the vacuum blanket in an operative position and showing how an extended reach may be provided for the operator;

FIG. 10 is a greatly enlarged, fragmentary cross-sectional view taken substantially along lines 10—10 of FIG. 2; and FIG. 11 is a fragmentary cross-sectional view, greatly enlarged, taken substantially along lines 11—11 of FIG. 10.

DETAILED DESCRIPTION OF A PREFERRED EMBODIMENT OF THE PRESENT INVENTION

Figure 4:
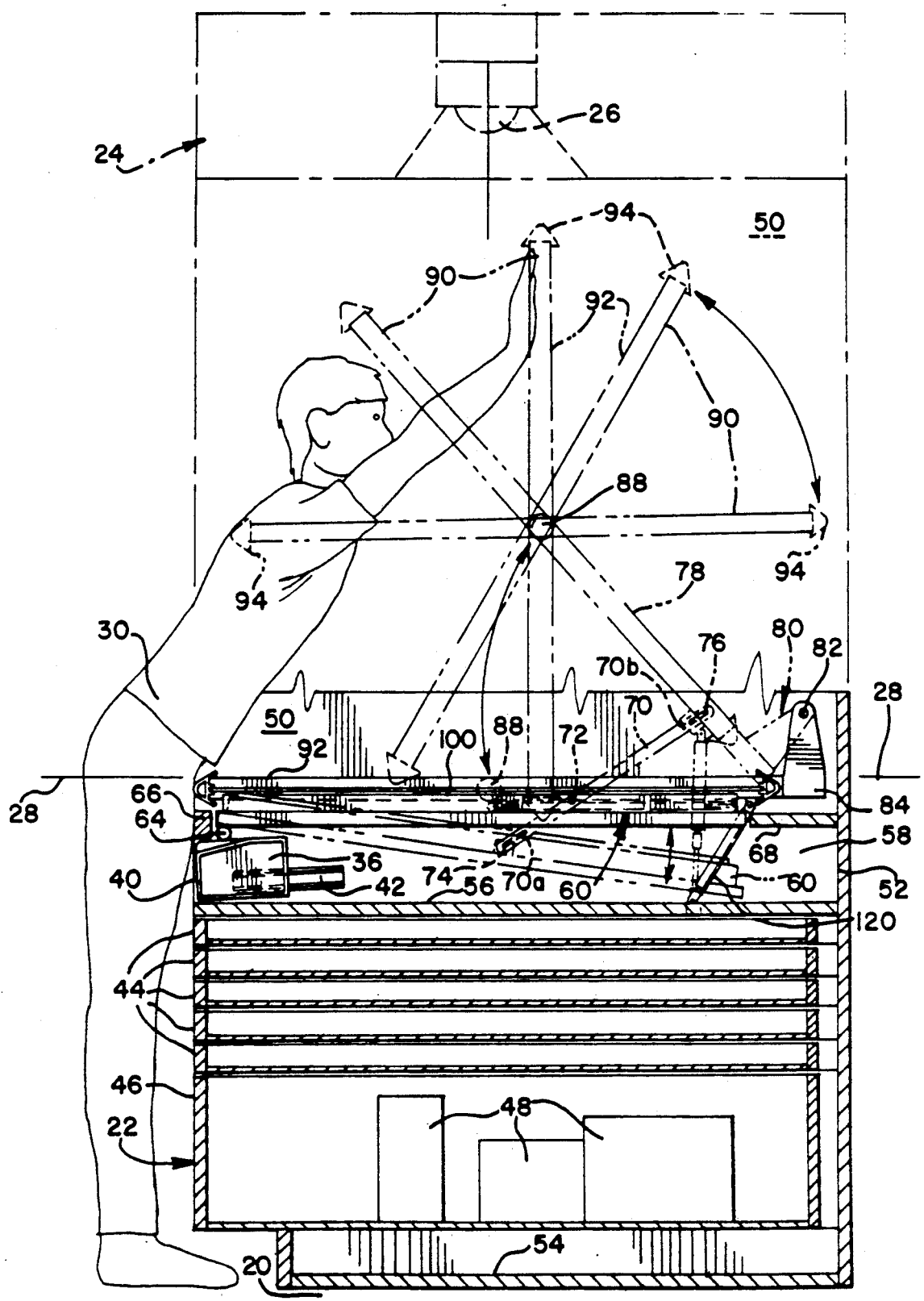
FIG. 4 is a vertical cross-sectional view of the apparatus taken substantially along lines 4—4 of FIG. 3, illustrating an operator in standing position cleaning a surface of the transparent panel on the glass frame.

Referring now more particularly to the drawings, therein is illustrated a new and improved graphic arts apparatus 20 adapted for exposing copy sheets to controlled intensity light from a light source passing through an image sheet. The apparatus 20 includes a lower cabinet portion 22 and an upper cabinet section 24 (FIG. 4) for supporting an overhead light source 26 generating high intensity light directed downwardly toward a horizontal work level 28 which is approximately waist-high to a standing operator 30 positioned in front of the cabinet in a standing position as illustrated.

As best shown in FIGS. 1-4, the lower cabinet 22 includes a front wall panel 32 having an elongated horizontal slot 34 for containing a control drawer 36 having an upwardly facing control panel 38 and a vertical front panel or pressure pad 40 for receiving pressure from the leg or mid-section of an operator 30 to move the control panel drawer 36 from an outwardly extended, operative position as shown in FIGS. 1, 2 and 5-9 to an inwardly retracted position as shown in FIGS. 4, 6 and 9. Reference should be had to a copending U.S. patent application Ser. No. 07/548,086, filed July 5, 1990, which describes the control panel and drawer system in more detail and which copending patent application is incorporated by reference herein and is assigned to the same assignee as the present application.

The drawer 36 is supported on a pair of downwardly and forwardly or outwardly tilted drawer slides 42 attached to opposite ends of the drawer so that when no body or leg pressure is applied by the operator 30 on the pressure pad 40, the drawer 36 will automatically return to the outer, operative position as shown wherein the upwardly facing control panel 38 is exposed ready to receive manual input from the operator 30.

Beneath the control panel drawer 36, the lower cabinet 22 is provided with a plurality of relatively thin or shallow depth slidable drawers 44 for receiving and holding image sheets, copy sheets, sheets of different types of film media and supplies generally used in printing operations. A large, deep, bottom drawer 46 is also provided for holding operative components of the exposure apparatus such as vacuum pumps, electric motors, power supplies 48 and the like.

The lower cabinet 22 includes a pair of vertically upstanding opposite side walls 50 supporting the upper cabinet structure 24 and various components in the apparatus 20 as will be described hereinafter. The cabinet structure includes an upstanding back wall 52, a bottom wall 54 and an intermediate level shelf 56 spaced below the control drawer 36 and defining a compartment 58 for receiving a vacuum blanket assembly 60 having a vacuum blanket 62 of resilient material on the upper surface thereof for supporting image and copy sheets thereon. Preferably, the vacuum blanket assembly 60 is of a type shown and described in copending U.S. patent application Ser. No. 07/353,055, filed May 17, 1989, incorporated herein by reference and assigned to the same assignee as the present application.

As illustrated in FIGS. 4-9, a forward end portion of the vacuum blanket assembly 60 is supported on pivots 64 on the side walls 50 spaced inside a forward rail 66 above the control drawer 36. As illustrated in FIGS. 4-9, a rearward portion of the vacuum blanket assembly 60 is movable downwardly from the horizontal, operative position as shown in FIGS. 4 and 9 to a downwardly and rearwardly tilted position as shown in dotted lines in FIG. 4 and solid lines in FIGS. 5-8 wherein a lower base of the vacuum blanket assembly is spaced below the level of a small rear shelf 68 spaced above the rearward portion of the compartment 58 and even with the front rail 66.

Movement of the vacuum blanket assembly 60 between the horizontal, operative position and a downwardly and rearwardly tilted, open position is controlled by a pair of linkage levers 70 pivotally secured to the inside surface of the cabinet side walls 50 on pivot pins 72 intermediate the opposite ends of the levers. Lower end portions of the linkage levers 70 are formed with elongated slots 70a which ride on support pins 74 projecting outwardly of opposites sides of a supporting frame of the vacuum blanket assembly 60.

When a portion of the linkage lever 70 rearwardly of the pivot pins 72 is allowed to pivot upwardly as shown best in FIGS. 5, 6, 7 and 8, the forward end portion of the levers containing the slots 70a move downwardly and this moves the rearward portion of the vacuum blanket assembly 60 downwardly away from the level of the work surface indicated by the line 28.

The elongated slots 70b at the rearward end portion of the linkage levers 70 are engaged by pins 76 extending outwardly from opposite side legs 78 of a U-shaped support yoke 80, pivotally mounted in an upper portion of the lower cabinet 22 on pivot axles 82 extending inwardly from opposite side walls 50. The pivots 82 are designed to support upper end portions of downwardly depending, yoke brackets 84 attached to opposite ends of an elongated central bight portion 86 of the yoke. The side legs 78 of the support yoke 80 project perpendicularly outward from opposite end portions of the bight 86 and each leg is provided with a inwardly directed pivot axle 88 for supporting a relatively large, rectangular glass frame 90 mounted on the yoke to pivot 360° about a central axis of the frame in coaxial alignment with the pivots 88 on the respective legs 78 as shown in FIGS. 4 and 7. The yoke 80 is supported in the upwardly tilted open position (FIG. 5) to remain open by a pair of gas springs 120. The yoke 80 also may provide support for a light-modifying apparatus mounted on the upper surface of the bight 86 and legs 78. Preferably, the light-modifying apparatus is of a type disclosed in copending U.S. patent application Ser. No. 07/548,087, filed July 5, 1990, which application is incorporated herein by reference and assigned to the same assignee as the present application. With such an apparatus mounted on the yoke 80, the gas springs 120 are increased in size to handle the increase in weight.

The glass frame 90 includes a pair of elongated, parallel, opposite side frame members 92 preferably formed of extruded aluminum as shown in cross-section in FIG. 11. The side frame members 92 are interconnected at opposite ends by a pair of front and rear elongated frame members 94, also preferably formed of extruded aluminum or other lightweight metal alloys and shown in a cross-sectional profile in FIG. 10.

The front and rear members 94 are identical and interchangeable in position and the rectangular frame of the glass frame 90 is dimensioned to fit closely within the rectangular space defined between opposite side legs 78 and the bight 86 of the U-shaped yoke 80 when the glass frame 90 is in parallel therewith as shown in FIGS. 1–4 and 9.

Because the pivot axles 82 supporting the yoke assembly 80 are spaced to the rear and upwardly of the glass frame 90 when the frame is in a horizontal position, upward pivotal movement of the glass frame 90 and yoke 80 into the tilted or open position always results in movement of the glass frame 90 in a continuous direction forwardly and away from the lower vacuum blanket assembly 60 which moves rearwardly and downwardly. Moreover, the interconnecting linkages provided by the levers 70, the support pins 72, 74 and 76 between the cabinet side walls 50, the side legs 78 of the yoke 80 and side members 92 of the glass frame 90 insure that proper functional interrelating movement is always achieved when the glass frame is manipulated to open and close.

The side, front and rear frame members 92 and 94 each have elongated, longitudinally extending slots 96 provided in an inner wall face thereof as shown in FIGS. 10 and 11, for receiving a marginal edge portion 98 of a transparent panel or sheet 100 formed of rigid plastic or glass and providing a stiff planar surface against which the copy and image sheets are pressed when the vacuum blanket 62 is operatively energized.

In accordance with the present invention, the yoke assembly 80 is pivotal between a horizontal copy making, operative position and an upwardly extended, open position, permitting an operator to inspect and clean the panel 100 on both sides by pivoting the panel relative to the supporting legs 78 and pivots 88 in a complete 360° rotation about the coaxial center axis of the glass frame 90. As illustrated in FIGS. 4 and 7, the glass frame 90 can be pivoted in either direction about the pivot axles 88 and when in a vertical position, the lowermost front or rear frame member 94 clears the upper surface of the vacuum blanket assembly 60 which is in a lowered position whenever the yoke assembly 80 is tilted upwardly.

The glass frame 90 may be locked into an aligned or parallel position with respect to the legs 78 of the yoke 80 by means of a pair of manually operable retractable latch pins 102 (FIG. 2), which pins are movable axially outwardly to disengage inner end portions 102a from respective slots or apertures provided in the adjacent glass frame side members 92. Thus, either side of the rigid transparent panel 100 can be positioned to face upwardly or downwardly and the supporting frame 90 can be locked into position by inward travel of the latches 102 and pins 102a to engage within the appropriate slots or apertures provided in the outer side wall surface of the respective side frame members 92. When it is desired to rotate the glass frame 90 on the pivots 88 for cleaning opposite sides thereof, the latches 102 are first retracted outwardly and the frame is then freely pivotal about the axles 88. This is only done when the yoke 80 is pivoted upwardly to an extended open position as shown in FIGS. 4–8. During pivotal movement of the yoke 80, the glass frame 90 is retained in the parallel position with the latches 102 engaged so that the yoke 80 and glass frame 90 move in unison.

An important feature of the present invention resides in the fact that the panel sheets 100 should they become damaged or discolored can be easily and rapidly removed and replaced from the supporting glass frame 90. For this purpose, the elongated side frame members 92 are provided with integral, longitudinally extending screw splines 106 which are adapted to receive shank portions 104a of a pair of self-tapping screws 104 at each end. The screws 104 have enlarged heads and the shanks 104a project through openings in the front and rear frame members 94 to secure the frame members 94 and 92 together. The removal of just two self-tapping screws 104 permits a front or rear member 94 of the glass frame 90 to be withdrawn from the side members 92 to expose a marginal edge 98 of the panel sheet 100. The panel sheet 100 can then be withdrawn outwardly and replaced with another panel sheet in rapid fashion. After replacement, the previously removed front or rear frame member 94 can again be secured to the side members 92 complete the assembled glass frame 90 by again installing the self-tapping screws 104.

In accordance with another aspect of the present invention, the front and rear frame members 94 are formed with flanges 108 extending angularly outwardly from the panel sheet 100 on opposite faces thereof and these flanges define elongated finger recesses 112 so that an operator's fingers may conveniently grasp a frame member 94 for pivoting the glass frame 90 about the axles 88 when desired as shown. End caps 114 are provided at the end of the front and rear frame members 94 to provide a finished look to the glass frame and these end caps may be formed of decorative plastic material.

In accordance with the present invention, a pair of gas springs 120 are interconnected between the cabinet side walls 50 and depending brackets 116 provided on the legs 78 of the U-shaped yoke assembly 80. As illustrated in FIG. 4, when the yoke 80 is in a horizontal position, the gas springs 120 are in a retracted condition and slope upwardly and rearwardly between the cabinet shelf 56 and the brackets 116 on the legs 78 of the yoke 80. When the yoke 80 is then moved to an open, upwardly tilted position as shown in FIG. 5, the gas springs 120 are extended and support the open yoke 80 and glass frame 90 in the sloping position as shown. The gas springs approach a near vertical position and provide the needed upward support force so that the yoke 80 and glass frame 90 remain in the upwardly extended position until again moved downwardly to the horizontal position. Because the gas springs are interconnected between the cabinet side walls 50 of the lower cabinet 22 and the yoke 80 and because the glass frame 90 is supported on the yoke 80 about a central axis, release of the latches 102 and pivotal movement of the glass frame 90 for inspection and cleaning does not greatly vary the weight forces on the gas springs 120. Thus, these springs 120 may be conveniently and accurately sized to support the weight of the components without encountering substantial variances due to changes in center of gravity of other components, etc.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. Graphic arts apparatus for exposing a copy sheet to light from a light source passed through an image sheet, comprising:
   light source means for directing light toward said image and copy sheets;
   glass frame means including a sheet of transparent material having a planar surface against which said image and copy sheets are pressed during an exposure cycle;
   vacuum blanket means for biasing said image and copy sheets against said planar surface;
   support means for supporting said glass frame means between said vacuum blanket means and said light source means in a first, closed position for exposing said copy sheet to light from said light source means passing through said transparent sheet and said image sheet, and a second, open position for permitting the removal and placement of said image and copy sheets between said glass frame means spaced apart from said vacuum blanket means;
   said support means including first means for pivoting said glass frame means to selectively expose opposite faces thereof in a forward facing direction while said support means is in said second open position,
   said support means including second means for pivoting said vacuum blanket means between a first position for biasing said copy sheet and said image sheet toward contact with said surface of said sheet of transparent material when said support means is in said first position and a second position spaced apart from said glass frame means when said support means is in said second position; and
   linkage means for interconnecting said glass frame means and said vacuum frame means to move said vacuum frame means into said second position when said glass frame means is moved into said second position.

2. The graphic arts apparatus of claim 1, wherein:
   said support means includes a U-shaped yoke means having a bight and a pair of side legs extending outwardly from opposite ends of said bight; and
   said glass frame means is supported for pivotal movement on said side legs about a pivot axis transverse to and intermediate opposite ends of said side legs parallel of said bight.

3. The graphic arts apparatus of claim 2, comprising:
   latch means for securing said glass frame means in a plurality of different rotative positions on said yoke means to selectively dispose opposite planar surfaces of said sheet of transparent material to face said vacuum frame means.

4. The graphic arts apparatus of claim 2, wherein:
   said glass frame means includes a pair of side members pivotally attached to said side legs of said yoke means and a pair of edge members secured to opposite ends of said side members, all of said members having a longitudinal groove on a side face for supporting an edge portion of said sheet of transparent material.

5. The graphic arts apparatus of claim 4, including:
   a pair of fasteners for detachably securing one of said edge members to adjacent ends of said side members, and removable to permit detachment of said one edge member from engagement with said side member whereby said sheet of transparent material can be withdrawn from said glass frame means.

6. The graphic arts apparatus of claim 5, wherein:
   said fasteners have elongated threaded shanks with heads at the outer end and said side members have elongated bores extending longitudinally inwardly from said adjacent ends for receiving said threaded shanks.

7. The graphic arts apparatus of claim 6 wherein:
   said heads of said fasteners are engaged to hold said one edge member against said adjacent ends of said side members when said shanks are in threaded engagement in said bores.

8. The graphic arts apparatus of claim 7, wherein:
   said heads are accessible externally of said one edge member for turning said threaded shanks to travel out of engagement with said bores of said side members to permit detachment of said one edge member for unencumbered slidable withdrawal and/or replacement of said sheet of transparent material.

9. The graphic arts apparatus of claim 4, wherein:
   said edge members include longitudinally extending opposite edge flanges outwardly projecting away from opposite faces of said sheet of transparent material providing finger recess for grasping said edge members to pivotally move said glass frame means.

10. Graphic arts apparatus for exposing a copy sheet to light from a light source passed through an image sheet, comprising:
    light source means for directing light toward said image and copy sheets;
    glass frame means including a sheet of transparent material having a planar surface against which said image and copy sheets are pressed during an exposure cycle;
    vaccum blanket means for biasing said image and copy sheets against said planar surface;
    support means for supporting said glass frame means between said vacuum blanket means and said light source means at a convenient working level in a first, horizontal closed position for exposing said copy sheet to light from said light source means passing through said transparent sheet and said image sheet, and a second, sloping open position for permitting the removal and placement of said image and copy sheets between said glass frame means spaced apart from said vacuum blanket means;
    said support means including cabinet means having a forward portion facing an operator and a rearward portion away from said operator and including first means for pivoting said glass frame means about a first pivot axis adjacent said rearward portion of said cabinet means spaced above an adjacent portion of said glass frame means to move the same between said horizontal first position and said second sloped position, said support means includes means for mounting said glass frame means on said first means to pivot relative thereto about a second pivot axis forwardly of said first pivot axis while said glass frame means is in said second position;

said support means including second means for supporting said vacuum blanket means for pivotal movement between a first horizontal position for biasing said image and copy sheets toward said glass frame means in said first position and a second position sloping downwardly away from said glass frame means; and linkage means for pivotally interconnecting said first means and said second means to move said glass frame means and said vacuum blanket means toward and away from one another during movement thereof between said first and second positions.

11. The graphic arts apparatus of claim 10, including:
releasable lock means for holding said glass frame means in a selected one of several rotative positions about said second pivot axis relative to said first means.

12. The graphic arts apparatus of claim 10, including:
spring means between said cabinet means and said first means for supporting said first means in an upwardly sloped position for holding aid glass frame means in said second open position.

13. The graphic arts apparatus of claim 12, wherein:
said spring means comprises gas spring means pivotally attached to said cabinet means and said first means independent of said glass frame means.

14. The graphic arts apparatus of claim 10, wherein:
said first means comprises yoke means having a bight spaced below said first pivot axis and a pair of legs extending outwardly of said bight and normal thereto along opposite edges of said glass frame means.

15. The graphic arts apparatus of claim 14, wherein:
said mounting means comprises a plurality of pivots on said second pivot axis extending between said legs of said yoke means and said opposite edges of said glass frame means.

16. The graphic arts apparatus of claim 10, including:
resilient means interconnecting said cabinet means and said first means for retaining said glass frame means and said vacuum blanket means in said second position spaced apart from one another.

* * * * *